United States Patent [19]
Lawler

[11] 3,977,387
[45] Aug. 31, 1976

[54] TEMPERATURE-CONTROLLED OVEN
[75] Inventor: Joseph A. Lawler, Flossmoor, Ill.
[73] Assignee: Blue M Electric Company, Blue Island, Ill.
[22] Filed: Feb. 10, 1975
[21] Appl. No.: 548,269

[52] U.S. Cl. .............................. 126/21 A; 126/247
[51] Int. Cl.² ......................................... F24C 15/32
[58] Field of Search ................. 126/21, 21 A, 247; 432/94, 219, 220, 221; 122/26

[56] References Cited
UNITED STATES PATENTS 3,467,179  9/1969  Tevis et al. ................... 126/247 X
3,807,383  4/1974  Lawler .............................. 126/247

Primary Examiner—Edward G. Favors
Attorney, Agent, or Firm—Burmeister, York, Palmatier, Hamby & Jones

[57] ABSTRACT

Inherent heating of the air in an oven by a high-velocity recirculating blower is used as constant rate thermal energy source. Constant temperature is maintained by varying the rate of blending of source of cooler air with the heated oven air. Automatic control of temperature is provided by a variable vent operated by a thermal expansion bellows, and a second control means is employed to prevent the oven from exceeding an adjustable maximum temperature.

10 Claims, 10 Drawing Figures

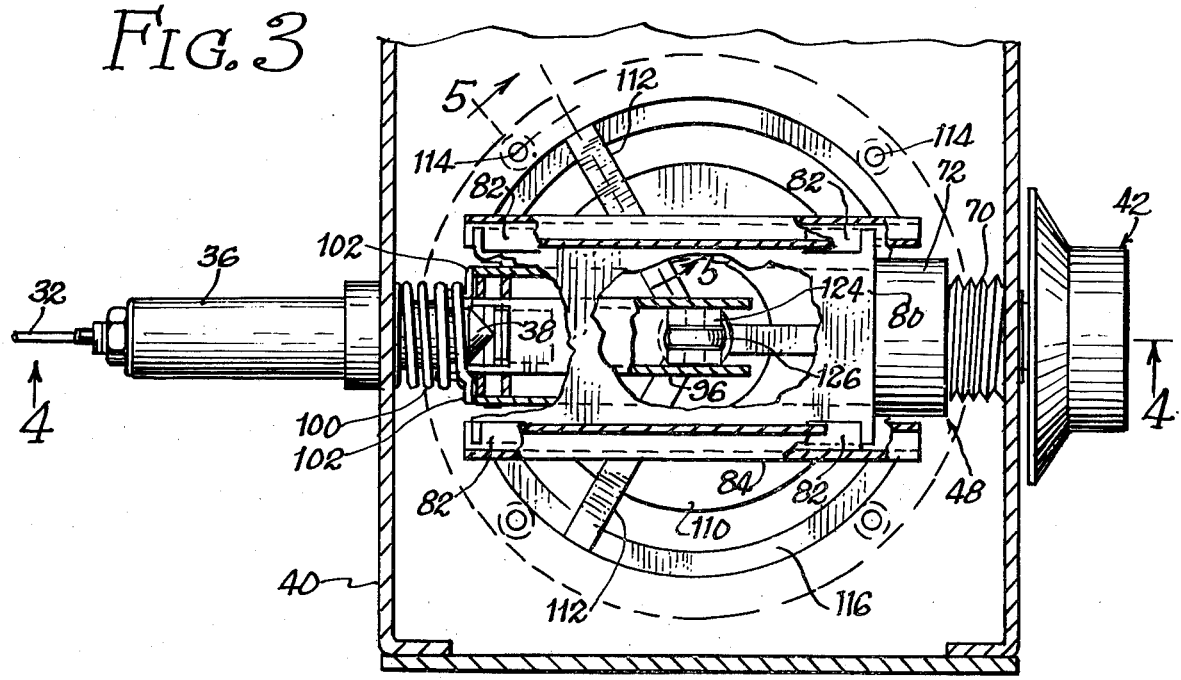
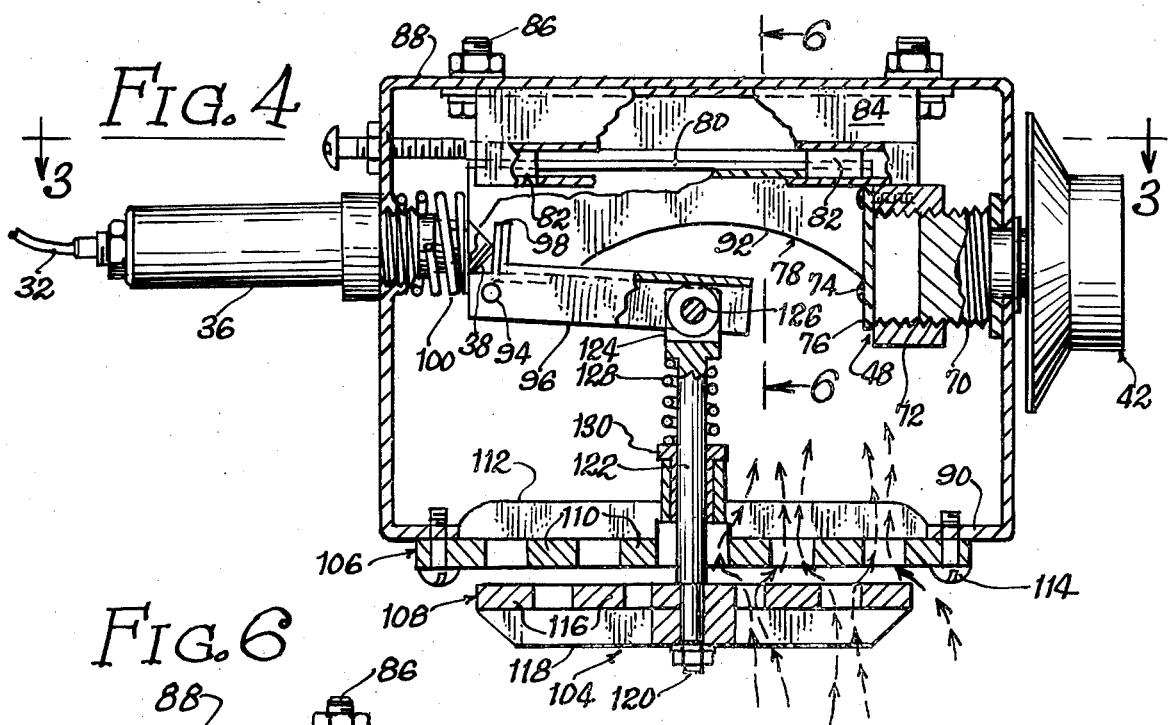
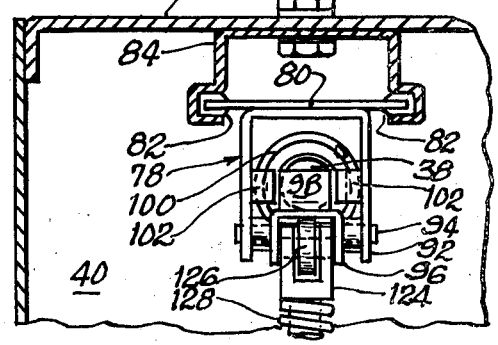

TEMPERATURE-CONTROLLED OVEN

This invention relates to temperature-controlled ovens, particularly to ovens for use with substances presenting hazards of explosion and the like.

Severe problems are encountered in the employment of ordinary oven constructions in numerous applications presenting explosion and similar hazards. A typical example is use of an oven in precision controlled temperature aging or similar long-term processing, or storage, of substances emitting explosive fumes or vapors. Ovens for such purposes have highly specialized requirements.

A fairly obvious and common requirement for an oven for chemical processing and similar uses, particularly where vapors or gases are emitted by the heating load, is a substantial rate of circulation of the internal gaseous medium, usually air. Were such circulation not provided, the heat energy absorbed (or in some cases generated) in the reaction which is the purpose of the processing would create local temperatures in the region of the heating load members defeating the basic purpose of the temperature control, in addition to possible other undesired effects. The circulation also serves a substantial purpose in connection with the explosion hazard, where such exists, since it prevents the accumulation of relatively undiluted hazardous vapors or gases. However, where the dilution is not in itself sufficient to prevent an explosion hazard, i.e., where the concentration of the hazardous substance in the oven air is sufficient so that the mixture can explode or ignite, it becomes highly necessary to assure against the existence of "hot spots" to which the oven air may find access, in addition to the obvious requirement of being wholly assured against sparks and the like.

The maintenance of any given work chamber temperature without having any portion of the interior of the oven at a considerably higher temperature is not a simple matter, and relatively complex and expensive structures have often been provided for minimizing the temperature differential between the work chamber and other parts of the oven interior. As in any oven wherein uniformity of temperature in the work chamber is an important characteristic, the heating of the oven air is normally done externally of the work chamber in a suitable part of the oven enclosure forming a recirculation or air return loop between the air outlet and air inlet portions of the work chamber, the blower also normally being disposed here. With an explosion hazard present, however, this heating may not be done with exposed heating elements or other comparably simple structure, and substantial complication is often introduced in reducing the maximum temperature to which the oven air is exposed. In addition, of course, the precautions against sparking, etc., are of similarly high requirement.

Oven systems for such purposes must ordinarily be provided with some form of venting to constantly introduce fresh air and at the same time exhaust a fraction of the recirculating air, such provision being required to prevent excessive buildup of reaction products in the oven aside from explosion hazard. The explosion problem can of course be avoided despite the presence of high temperature zones like heater elements, etc., if the rate of bleeding in of fresh air is sufficiently high so that a mixture of reaction products and air is never adequately rich to be ignited. Thus, one known alternative for complexity of construction is substantial abandonment of the recirculation of oven air, fresh air being constantly drawn in from the exterior, heated to the requisite temperature, flushed through the work chamber and thereupon exhausted with the reaction products. Such a "once through" system requires relatively large heating elements and heating power even for relatively low temperatures, in addition to the fact that closeness of control of temperature, and uniformity of the temperature throughout the volume, are more difficult to obtain than in the case of recirculated air maintained within the enclosure.

A further, but related, difficulty heretofore encountered in controlled temperature ovens for these and similar purposes is inability, in any simple manner, to achieve the maintenance of relatively low temperatures of the recirculated air. Where the temperature is controlled by varying the power to heating elements, whether in proportional control or on-off cycle control, effective control cannot be obtained in the temperature region where the total required heat input rate is of the same order as the variation of the heat transfer variables, such as reaction rates in work pieces, which produce temperature variations for which automatic compensation is to be effected. Where a high velocity blower is employed for circulation, it is found that control by heater power variation becomes erratic and ineffective at temperatures considerably higher than ambient temperatures due to air heating by the blower. To deal with this problem where temperatures only moderately above ambient temperature are wanted, various devices have heretofore been used, such as the addition of a refrigerating unit in addition to a heater unit, thus extending the lower end of the temperature control range.

In accordance with the invention of one of the present inventors, Joseph L. Lawler, set forth in U.S. Pat. No. 3,807,383 and U.S. Pat. application No. 463,574, the prior art difficulties may be alleviated or eliminated by heating the air in the furnace by friction and pressure phenomena such as those occurring at the blades of a blower. Thus, the air itself can be made the highest temperature portion of the system. With this possibility, obtained from the nature of the basic process by which heat is imparted to the air, elaborate provisions for assuring against "hot spots" are eliminated without impairing the safety of permitting relatively high concentrations of hazardous reaction products to be present in the recirculated air.

Further, a constant speed blower constitutes a heat energy source which imparts heat to the air it moves at a constant rate. This is particularly true when driven by an alternating current motor, since the speed of the motor is independent of the amplitude of the supply within its operating range and the supply frequency is usually accurately held constant. The blower may be utilized as the sole heat source, as described in U.S. Pat. No. 3,807,383 or used in conjunction with other constant heat energy source as described in U.S. application Ser. No. 463,574. The fact that a constant rate heat energy source is used permits employment of a relatively small but adjustable fresh air bleeding rate for controlling oven temperature.

Even an oven utilizing a blower as its sole source of heat and controlled by controlling the flow of ambient air into the oven, as described in U.S. Pat. No. 3,307,383, may under some circumstances develop higher temperature than permissible for the particular work load. An accidental or faulty setting of the temperature control may result in excessive oven temperatures. An operator, either in changing loads or in carrying out a particular sequence of temperatures in processing a given work load, may set a temperature higher than permissible for the particular work load. A faulty temperature sensing device may result in failure of the control mechanism to prevent a rise in temperature. Enumerable other malfunctions or operator errors may also result in excessive temperatures developing in the oven.

In accordance with the present invention, a temperature control for an oven has been provided designed to failsafe in the event of malfunction or operator error. In the event the temperature of the oven exceeds a precalibrated temperature, the failsafe mechanism vents the oven to the ambient atmosphere, thereby lowering the temperature of the oven and preventing a termperature rise. The mechanism for venting the oven to the atmosphere also is provided with an indicator which may be visually observed by an operator to advise him of the fact that the failsafe mechanism has been actuated, or in the alternative, that the oven is under the control of the normal operating temperature control mechanism.

The above aspects of the invention, as well as certain further ones, will best be understood by reference to the embodiment illustrated in the drawings, in which:

FIG. 3 is a sectional view of the temperature control of the oven of FIGS. 1 and 2, taken along the line 3—3 of FIG. 4;

FIG. 4 is a sectional view taken along the line 4—4 of FIG. 1;

FIG. 5 is a fragmentary enlarged view taken along the line 5—5 of FIG. 3;

FIG. 6 is a fragmentary sectional view taken along the line 6—6 of FIG. 4;

Figure 1:
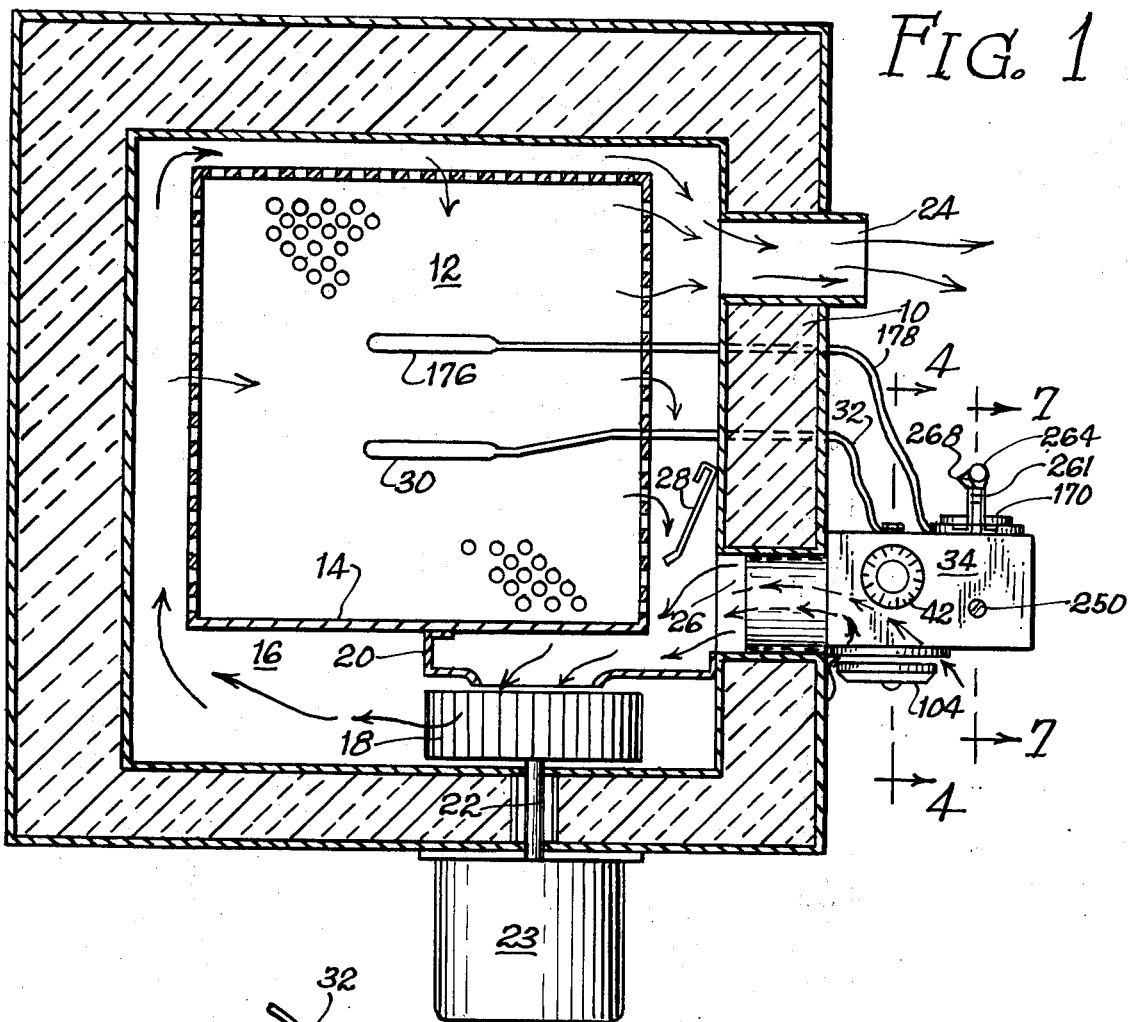
FIG. 1 is a schematic sectional view of a temperature-controlled oven incorporating the invention and showing a temperature control assembly in front elevational view.
Figure 2:
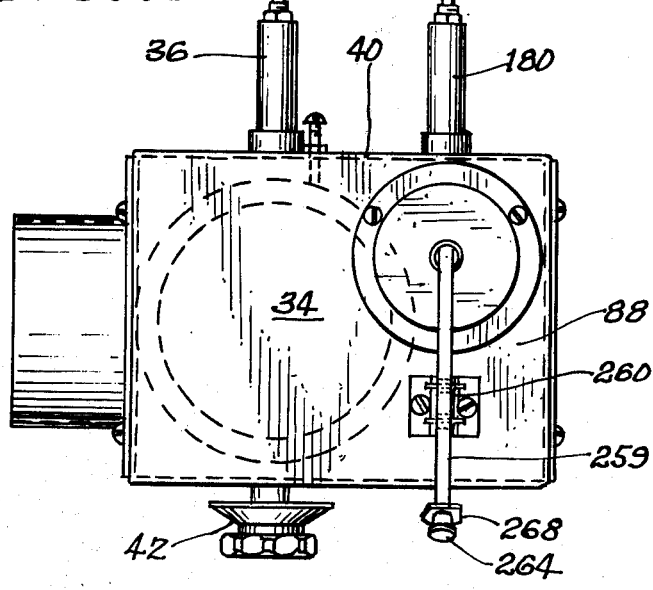
FIG. 2 is a plan view of the temperature control assembly of FIG. 1.
Figure 7:
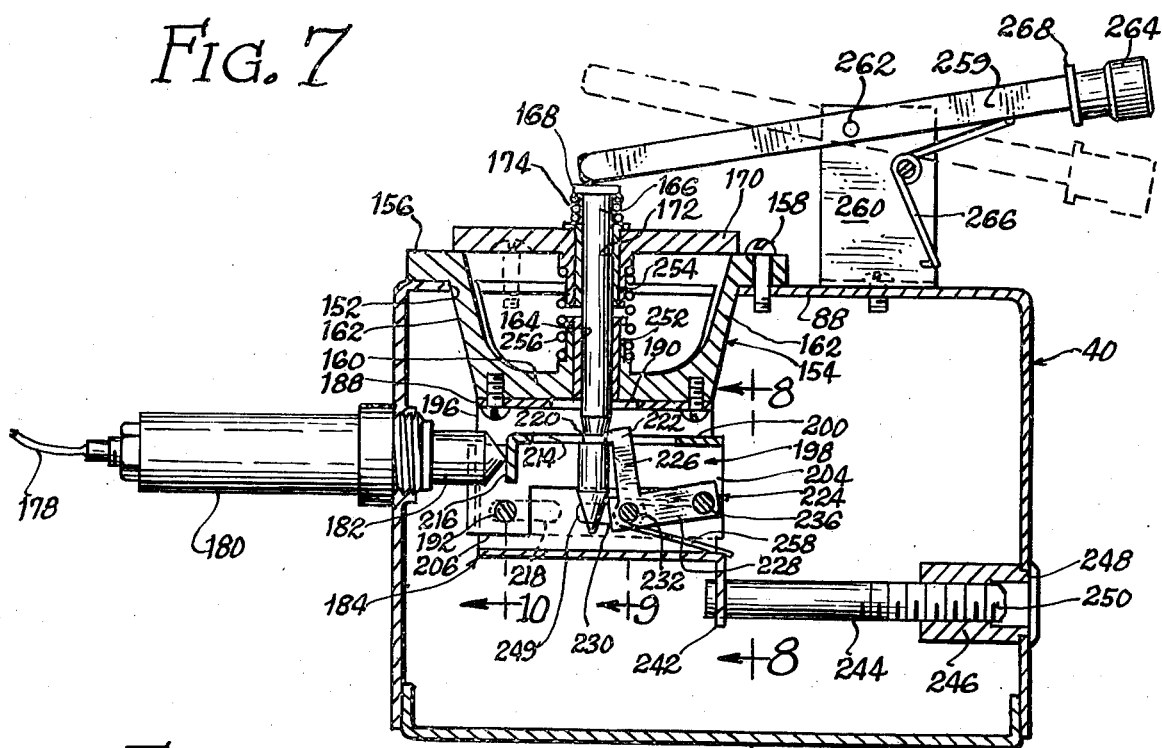
FIG. 7 is a sectional view of the temperature control taken along the line 7—7 of FIG. 1.
Figures 8, 9, 10:
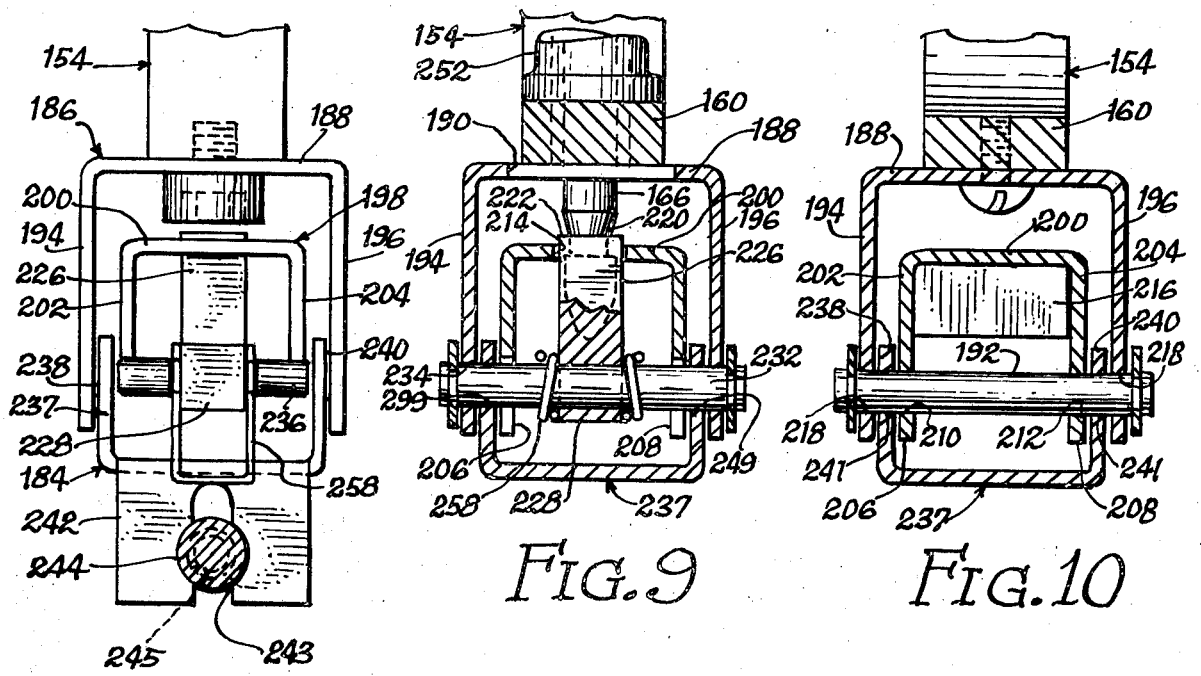
FIG. 8 is a fragmentary sectional view of the temperature control taken along the line 8—8 of FIG. 7.
FIG. 9 is a fragmentary sectional view taken along the line 9—9 of FIG. 7.
FIG. 10 is a fragmentary sectional view taken along the line 10—10 of FIG. 7.

Except for the temperature control device, which will be described hereinafter, the oven of FIG. 1 is of conventional construction and thus is only schematically shown. The outer wall or enclosure 10 is of a usual thermalinsulated construction sealed against air leakage except at the vents later mentioned. The work chamber 12 (to which access is provided by the oven door, not shown) is formed of suitable perforated sheet metal except for the imperforate floor portion 14, below which is a lower internal region 16 of the oven forming a return path for the generally horizontal circulation of air through the work chamber 12. Air circulation is provided by a high velocity centrifugal blower 18 associated with a sheet metal duct or hood 20 which forms the air inlet for the blower, returning the work chamber exit air to the blower for recirculation. The blower shaft 22 is externally driven by a constant speed alternating current motor 23 mounted below the blower. The motor 23 is external of the oven, which accordingly contains no electrical components.

An air outlet vent 24 is provided through the upper portion of the air exit end of the enclosure 10 and an air inlet vent 26 through the lower portion. Slightly above inlet vent 26 is a vane or damper 28 which forms an adjustable constriction in the air flow path between the exit end of the chamber 12 and the inlet duct 20 to the blower. Opening of such a damper to any predetermined degree has heretofore been used to control the rate of replacement or renewal of the recirculating air. In employment of the present invention, the damper 28, where one is provided, is placed in a predetermined partially open fixed position to produce a small pressure difference between the inlet and outlet vented portions of the recirculation system.

The heat source for the oven illustrated in FIG. 1 is the high capacity blower 18 and is a constant rate thermal energy source. Temperature control is effected by automatic control of the venting, thus controlling the rate of blending of ambient temperature air with the recirculated air in the oven. For this purpose, there is attached to the inlet vent at 26 a control mechanism responsive to the temperature sensed by the bulb 30 of a thermal expansion temperature transducer having a capillary tube 32 connected as hereinafter described to an external temperature control device or assembly 34.

FIGS. 3 through 6 illustrate the construction of the temperature control assembly 34 which is substantially the same as that described in detail in U.S. Pat. No. 3,807,383. The capillary tube 32 extends from the temperature sensing bulb 30 to a bellows assembly 36. The bellows assembly 36 is mounted on a housing 40 of the temperature control assembly 34 and has a plunger or piston 38 extending into the housing. Calibrated knob-and-dial 42 are mounted on the housing 40 at the end opposite the plunger 38 and a screw mechanism 48 is employed in connection therewith. A large diameter screw 70 is attached to the knob 42 and engages an internally threaded sleeve 72 affixed by bolts 74 to a plate 76 secured to the end of a carriage 78. The carriage comprises a plate 80 having slide shoes 82, of nylon or the like, on laterally opposite edges, the latter being slideable in opposed recesses formed in a shaped sheet metal track 84 bolted at 86 to an upper wall 88 of the housing 40.

A pair of spaced depending webs 92 are disposed on the underside of the sliding plate 80 and the webs are affixed at one end to the plate 76. A pivot pin 94 for a lever 96 extends between the webs 92 at the opposite end thereof. The lever 96 extends generally horizontally but has an upward extension tab or striker 98 at the pivoted end disposed in the path of the plunger 38. A spring 100 compressed between the housing 40 and ears 102 on the carriage 78 prevents backlash of the screw mechanism 48, assuring accurate reproducibility of carriage position with dial setting.

A variable vent generally indicated at 104 is formed of a stationary inner portion 106 and a reciprocable outer portion 108. The stationary portion has radially spaced concentric rings 110 maintained in this relative position by four radial webs 112, this assembly being mounted by screws 114 in a large aperture in the bottom of the housing 90. The reciprocable portion 108 also has concentric rings 116, maintained in relative position by radial webs 118. The reciprocable assembly is centrally secured at 120 to a drive rod 122 which extends up through the axis of the stationary portion 106 and has mounted at its upper end a yoke 124 bearing a roller wheel 126 which contacts the lever 96. A compression spring 128 urges the rod 122 upward, acting between the corners of the yoke 124 and a shouldered nylon bearing sleeve 130 lining the hub of the stationary portion 106 for free sliding motion of the drive rod 122.

The concentric rings 110 of the stationary portion are offset radially from the concentric rings 116 of the reciprocable portion, the latter being opposed to, and of radial thickness only slightly greater than, the radial width of the annular spaces between the rings 110. In the closed position (FIG. 5) a substantially entire blockage of air is readily achieved with reasonably smooth surface finishes at the contacting edges of the rings. The rate of change of air resistance with inward or outward motion of the reciprocable portion 108 is extremely high in the region adjacent to complete closure, so that very small motion produces a large variation of oven air intake. This variable vent structure, in addition, has very small resistance to air flow for the area occupied when the vent is only moderately opened in position.

In the closed position of the vent, the lever 96 is substantially parallel with the path of motion of the plunger 38, which is in turn substantially parallel with the track 84 along which the carriage 78 is moved for temperature adjustment. Since the roller 126 supports the lever 96 in this parallel condition when the vent is closed, temperature adjustment prior to startup does not alter the rotational position of the lever 96 about its pivot 94. Accordingly, the point at which the plunger 38 engages the tab or striker 98 to commence opening of the vent after startup varies in exact correspondence with the position of the carriage, i.e., the distance of advancement or retraction of the carriage produces substantially exactly the same difference in extension of the plunger 38 at which opening of the vent commences.

FIGS 7 through 10 show the mechanism for limiting the temperature within the oven 12 in detail. The housing 40 is provided with an opening 150 in the wall 88 opposite the variable vent 104. The opening 150 accommodates a depending bracket 154 which has a circular flange 156 mounted on the exterior of the wall 88 by a plurality of bolts 158. The bracket 154 has a cross arm 160 which is disposed parallel to the wall 88 and has extensions 162 at opposite ends joining the flange 156 in an integral unit.

The cross arm 168 is provided with a central aperture 164 and the pin 166 is journaled within the aperture 164. The pin 166 is provided with an outwardly extending head 168, and an annular cover 170 has a central aperture 172 journaled about the pin 166. A spiral spring 174 is disposed between the cover 170 and the head 168.

A second bulb is disposed within the oven 12 and connected to the control unit 34 by means of a capillary tube 178 and a bellows assembly 180. A piston 182 extends into the housing 40 from the bellows assembly 180, and in response to increases in temperature in the oven, the piston 182 is translated with respect to the bellows assembly 180 further into the housing 40. The piston 182 engages a cover release mechanism 184 which is operatively associated with the cover 170. When the temperature within the oven 12 exceeds a threshold value, the cover release mechanism 84 is actuated by the piston 182 to release the cover 170 and open the opening 150 between the housing 40 and the ambient atmosphere, thereby permitting ambient air to enter the housing 40 and subsequently the oven 12 to limit the maximum temperature within the oven 12.

The cover release mechanism utilizes a U-shaped support member 186 having a flat central portion 188 mounted on the arm 160 of the bracket 154. The central portion 188 has an opening 190 accommodating the pin 166 which depends from the bracket 154.

A first pin 192 extends through the confronting side portions 194 and 196 of the support member 186. The first pin 192 is disposed adjacent to the piston 182 of the bellows assembly 180 and on the opposite side thereof from the central portion 188 of the support member 186. A latch release member 198 is pivotally mounted on the first pin 192.

The latch release member 198 is also a U-shaped member with a central flat portion 200 and a pair of sides 202 and 204 extending normally from the flat central portion 200. A pair of tabs 206 and 208 extend downwardly from the sides 202 and 204, respectively, and the tabs 206 and 208 contain apertures 210 and 212 which are journaled about the first pin 192. The flat central portion 200 of the latch release member 198 is provided with an elongated central slot 214 which accommodates the pin 166. Further, a downwardly extending striker face 216 is disposed at the end of the central portion of the latch release member 198 to confront the piston 182 of the bellows assembly 180. The support member 186 is provided with a pair of confronting elongated slots 218 parallel to the axis of travel of the piston 182 to permit the first pin 192 to be translated with respect to the support member 186 in response to changes of position of the piston 182.

The pin 166 is provided with a groove 220 adjacent to the slot 214 in the latch release member 198, and the circular groove 220 is adapted to receive an outwardly extending pawl 222 of a latch member 224. The latch member 224 has two arms 226 and 228 extending from a common portion, and the common portion has an opening 230 journaled about a second pin 232. The second pin 232 is journaled in apertures 234 in the side portions 194 and 196 of the support member 186, thereby providing a fixed pivotal axis for the latch member 224 with respect to the housing 40. The arm 228 is also provided with a shaft 236 which extends therethrough remote from the second pin 232 between the side plates 194 and 196 of the support member 186 to confront the edges of the sides of the latch release member 198.

The threshold temperature is established by controlling the position of the first pin 192, and hence, the striker face 216, with respect to the position of the piston 182. A third U-shaped member 237 has upwardly extending sides 238 and 240 with confronting apertures 241 which are journaled about the first pin 192 thereby mounting the first pin on the third member 237 in a fixed position relative thereto. The third member 237 has a downwardly extending tab 242, with a slot 243 which is journaled with a circular groove 245 of a screw 244, and the screw 244 is journaled within a threaded retainer 246 mounted in an aperture 248 in the front panel of the housing 40. The third member 237 is mounted on the depending bracket 154 by the second pin 232 by a pair of confronting elongated slots 249, shown in FIGS. 7 and 9, which permit the third member to be translated along the axis of translation of the piston 182 relative to the housing 40. The screw 244 has a screwdriver slot 250 to permit adjustment thereof. Rotation of the screw 244 causes the screw 244 to be translated in the retainer 246, thus positioning the first pin 192 with respect to the piston 182 and establishing the threshold temperature.

The arm 160 has an upwardly extending cylindrical seat 252, and the cover has a downwardly extending cylindrical seat 254, and a spiral spring 256 is anchored on the seats 252 and 254 and urges the cover 170 outwardly with respect to the flange 156. The spring 174 between the cover 170 and the head 168 of the pin 166 and the spring 256 place an upward thrust on the pin 166 in engagement with the pawl 222 of the latch member 224. In addition, a spring 258 is journaled about the second pin 232 and has one end in abutment with the third U-shaped member 237 and the other end engaging the pin 236 to urge the pawl toward the pin 166.

A reset arm 259 is mounted on a bracket 260 extending upwardly from the wall 88 of the housing 40 by means of a pin 262. The reset arm 259 has a knob 264 at one end and extends at the other end to directly confront the head 168 of the pin 166. The arm is spring-biased to abut the head 168 by means of a spring 266 which engages the bracket 260 at one end and the arm 259 at the other end. An indicator 268 is mounted on the arm 259 at the knob 264.

In operation, the threshold temperature is established for the oven 10 prior to operation by actuation of the screw 244, thereby locating the axis for the first pin 192 with respect to the piston 182. To place the oven in operation thereafter, the knob 264 is pushed upwardly to drive the pin 166 downwardly to cause the pawl 222 of the latch member 224 to engage the circular groove 220, thereby forcing the cover 170 downwardly into abutment with the flange 156, thereby sealing the opening 150 in the housing 40 and permitting control by the vent 104. If the temperature within the oven 12 increases, the bulb 176 will sense the change in temperature, and acting through the capillary tube 178, translate the piston 182 inwardly. Inward translation of the piston 182 applies force against the striker face 216, thereby causing the latch release member 198 to pivot on the first pin 192, which is secured in fixed position by the threshold setting screw 244. Rotation of the latch release member 198 on the first pin 192 results in the edges of the side portions 202 and 204 of the latch release member 198 engaging the pin 236 mounted on the latch member 224, thereby pivoting the latch member 224 on the second pin 232 and disengaging the pawl 222 from the circular groove 220 of the pin 166. Thus, the pin 166 is released, and the spiral springs 174 and 256 drive the cover 170 from the flange 156, thereby opening the opening 150 to the ambient atmosphere and permitting the ambient air to freely enter the oven 12.

From the foregoing specific embodiment, those skilled in the art will readily devise modifications and equivalent structure for responding to temperatures in an oven in excess of the threshold value to vent the oven to the ambient atmosphere. It is therefore intended that the scope of the present invention be not limited by the foregoing disclosure, but rather only by the appended claims.

The invention claimed is:

1. A temperature-controlled oven comprising, in combination:
   a. an outer thermal-insulation leakage sealed enclosure,
   b. an inner chamber within the enclosure adapted to receive bodies to be maintained at constant temperature and having gas inlet and gas outlet portions,
   c. gas recirculation means within the enclosure adjacent to the inner chamber including a constant speed gas blower and gas duct means guiding outlet gas from the chamber back to the inlet portion, said gas blower constituting a heat source for said oven,
   d. a source of gas exterior of the emclosure at constant temperature different than the inner chamber,
   e. a gas inlet vent and a gas outlet vent through the enclosure in regions of differing internal gas pressure, said inlet vent communicating with the source of gas and continuously blending gas from the source into the gas duct means for recirculating gas within the enclosure,
   f. a first control means on at least one of said vents responsive to the oven temperature to vary the rate of blending of gas from the source of gas to the gas duct means, and
   g. a second control means on at least one of said vents responsive to a threshold temperature within the inner chamber to couple the inner chamber to the source of gas for blending gas from the source with gas in the inner chamber at a rate greater than the blending rate of gas from the source established by the first control means.

2. A temperature-controlled oven comprising the combination of claim 1 wherein the second control means includes manually adjustable means for establishing the threshold temperature.

3. A temperature-controlled oven comprising, in combination:
   a. an outer thermal insulation leakage sealed enclosure.
   b. an inner chamber within the enclosure adapted to receive bodies and having air inlet and air outlet portions,
   c. air recirculation means within the enclosure adjacent to the inner chamber including an air blower and air duct means guiding air from the outlet portion of the chamber back to the inlet portion, and
   d. means coupled to the air recirculation means responsive to a threshold temperature within the inner chamber to open the inner chamber to the ambient atmosphere comprising means defining a port extending from the air duct means through the enclosure and communicating with the ambient atmosphere, closure means mounted adjacent to the port having a member movable between a first position in which the port is unrestricted and a second position in which the port is restricted, positioning means for said movable member normally positioning the movable member in the second position, said positioning means moving the movable member responsive to an increase in temperature within the inner chamber above the threshold value to position the closure mechanism in the first position to permit the ambient atmosphere to freely enter the chamber.

4. A temperature-controlled oven comprising the combination of claim 3 wherein the means defining a port comprises a housing exterior of the enclosure having an orifice communicating with the air duct means, and a port in the housing communicating with the ambient atmosphere, and wherein the closure means comprises a bracket mounted on the housing and disposed within the housing confronting the port, said bracket having an aperture extending therethrough confronting the port, a pin journaled within the aperture and extending through the port and having a protrusion exterior of the housing, and the movable member being a cover adapted to seal the port having a central aperture journaled on the pin between the protrusion thereof and the housing.

5. A temperature-controlled oven comprising the combination of claim 4 wherein the positioning means comprises a latch pivotally mounted on the bracket having an arm provided with an outwardly extending pawl spaced from the pivotal axis and confronting the pin, said pin having a groove therein adapted to receive the pawl, a first spring disposed between the protrusion of the pin and the cover urging the cover toward the housing, a second spring disposed between the bracket and the cover urging the cover away from the housing, the force of the second spring on the cover being overcome by the force of the first spring on the cover when the pawl of the latch engages the groove of the pin, and the force of the second spring on the cover overcoming the force of the first spring on the cover when the pin is released from the pawl of the latch and is translated toward the opening.

6. A temperature-controlled oven comprising the combination of claim 5 wherein the positioning means includes a bellows assembly mounted on the housing adjacent to the bracket having a piston translatable normal to the pivotal axis of the latch responsive to the temperature of the oven, a latch release member supported on the bracket for pivotal motion along an axis parallel to the pivotal axis of the latch and disposed on the side of the piston opposite the bracket, said latch release member having a strike face confronting the piston, the latch being provided with an arm extending therefrom, said arm abutting the latch release member and transmitting force from the piston to the pawl to remove the pawl from the groove.

7. A temperature-controlled oven comprising the combination of claim 6 wherein the positioning means includes means for manually positioning the pivotal axis of the latch release member in a plane parallel to the axis of translation of the piston.

8. A temperature-controlled oven comprising the combination of claim 7 wherein the manual means for positioning the pivotal axis of the latch release member comprises a channel member mounted on the bracket for translation along an axis parallel to the translational axis of the piston, the pivotal axis of the latch release member being mounted on the channel member normal to the translational axis of the channel member on the bracket, a rod rotatably anchored on the channel member and extending therefrom parallel to the translational axis of the channel member, said rod having screw threads thereon remote from the channel member, and a threaded retainer mounted on the housing and engaging the threads of the rod, whereby rotation of the rod translates the pivotal axis of the latch release member.

9. A temperature-controlled oven comprising the combination of claim 5 in combination with a reset arm pivotally mounted on the housing having a knob at one end and an end opposite the knob confronting the pin exterior of the housing.

10. A temperature-controlled oven comprising the combination of claim 9 in combination with a spring mounted between the housing and the arm urging the arm into abutment with the pin.

* * * * *